United States Patent [19]

Ogasawara et al.

[11] 4,273,002
[45] Jun. 16, 1981

[54] FACE GEAR ASSEMBLY

[76] Inventors: Hiroomi Ogasawara, 3821-4; Masaomi Ogasawara, 3833, both of Yamakita, Yamakitamachi, Ashigarakami-gun, Kanagawa-ken, Japan

[21] Appl. No.: 20,110

[22] Filed: Mar. 12, 1979

[51] Int. Cl.³ .......................... F16H 55/06; F16H 1/12
[52] U.S. Cl. ........................................... 74/462; 74/416
[58] Field of Search ...................... 74/412 R, 416, 417, 74/457, 458, 459.5, 460, 462, 466, 424.5

[56] References Cited

U.S. PATENT DOCUMENTS

| 264,483 | 9/1882 | Smith | 74/459.5 X |
|---|---|---|---|
| 1,425,144 | 8/1922 | Schmick | 74/462 |
| 1,683,758 | 9/1928 | Candee et al. | 74/416 X |
| 1,694,027 | 12/1928 | Wildhaber | 74/459.5 |
| 1,833,159 | 11/1931 | Garnett | 74/462 |
| 3,524,361 | 8/1970 | Iyol et al. | 74/459.5 X |

FOREIGN PATENT DOCUMENTS

| 487300 | 6/1918 | France | 74/416 |
| 725982 | 3/1955 | United Kingdom | 74/462 |

Primary Examiner—Lawrence J. Staab
Attorney, Agent, or Firm—Beveridge, DeGrandi, Kline & Lunsford

[57] ABSTRACT

In a face gear assembly comprising a face gear and a pinion engaged therewith, the crest or top land of each tooth of the face gear is so formed as to touch the root surface or bottom land between two adjoining teeth of the pinion which are in mesh with the tooth, whereby the mutual engaging relationship of the face gear and the pinion can be regularly maintained.

1 Claim, 2 Drawing Figures

FACE GEAR ASSEMBLY

BACKGROUND OF THE INVENTION

This invention relates to improvements in a face gear assembly. Generally, a face gear assembly comprises a face gear having a planar pitch plane and a pinion, such as a spur gear or helical gear, engaged with the face gear. In a conventional face gear assembly, there is provided a radial clearance between the tooth crests or top lands of the face gear and the tooth root surfaces or bottom lands of the pinion.

The conventional face gear assemblies are accompanied by a problem in that if the rotational axis of the pinion deviates perpendicularly from the regular position for some reason, the relative engaging position of the pinion and the face gear will be changed, and accordingly, the relative engaging position between them cannot be regularly or precisely maintained.

Furthermore, when the face gear and the pinion are to be assembled so as to be brought into mesh with each other, it has been difficult to set regularly and precisely relative position between the pitch plane of the face gear and the rotational axis of the pinion.

SUMMARY OF THE INVENTION

Accordingly, it is an object of this invention to provide an improved face gear assembly of the type referred to above in which the regular relative engaging position between the face gear and the pinion can be easily obtained and maintained, and the two gears can rotate smoothly because of no play or clearance between the tooth crests of the face gear and the tooth root surfaces of the pinion.

According to this invention, there is provided a face gear assembly comprising a face gear having teeth arranged in annular disposition and directed in the direction parallel to the rotational axis of the face gear, each of said teeth having a crest, and a pinion having teeth in engagement with said teeth of the face gear, said pinion having a root surface between two adjoining teeth thereof, said crest being formed to contact the root surface between two adjoining teeth of the pinion which are in mesh with the tooth of said crest.

The nature, utility and further features of this invention will be more clearly apparent from the following detailed description with respect to a preferred embodiment of the invention when read in conjunction with the accompanying drawings.

DETAILED DESCRIPTION

Figure 1:
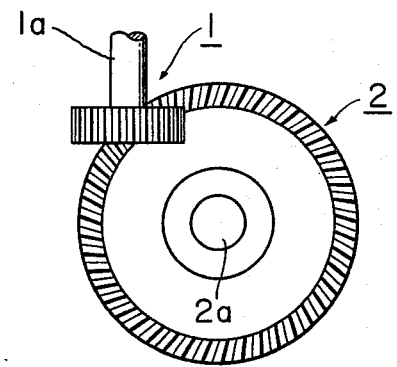
FIG. 1 is a plan view showing a face gear assembly according to this invention.

Referring to FIG. 1, the face gear assembly according to this invention comprises a pinion 1 such as a spur gear, and a face gear 2, similar to a crown gear, meshing with the pinion 1. The face gear 2 has a planar pitch plane and the face gear 1 and the pinion 2 are respectively fixed to their shafts 1a and 2a.

Figure 2:
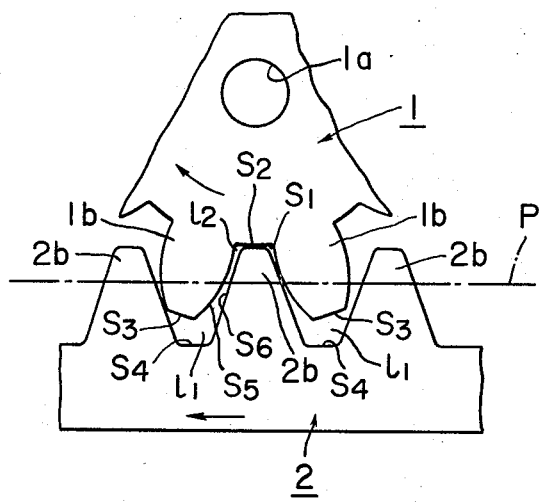
FIG. 2 is a detailed fragmentary view showing the meshing part of the face gear assembly.

FIG. 2 is a detailed view, showing the meshing parts of the face gear assembly of this invention.

The pinion 1 has teeth 1b each having a crest or top land $S_3$ and flanks $S_5$. A root surface or bottom land $S_1$ is formed between adjoining teeth 1b. The face gear 2 has teeth 2b formed in annular disposition on the peripheral part of the planar surface thereof and extending in the direction parallel to the rotational axis thereof, each of the teeth 2b having a crest or top land $S_2$ and faces $S_6$. A root surface or bottom land $S_4$ is formed between adjoining teeth 2b. The pitch plane of the teeth of the face gear 2 is designated by P.

The crest $S_2$ of each tooth 2b of the face gear is so extended beyond its normal contour that it will be brought into contact with the root surface $S_1$ between two adjoining teeth 1b with which the tooth 2b is in mesh. Alternatively, the root surface $S_1$ may be so extended radially outwardly beyond its normal contour instead of the crest $S_2$ being extended beyond its normal contour.

In the region when the teeth 1b and 2b are in mesh, there is a clearance $l_1$ between the crests $S_3$ of each of the teeth 1b and the opposite root surface $S_4$. A certain backlash $l_2$ exists between the flanks $S_5$ and $S_6$ of the mutually meshing teeth 1b and 2b, as shown.

In FIG. 1, the pinion 1 is in the form of a spur gear and the center axis of the shaft 1a of the pinion 1 does not intersect the center axis of the shaft 2a of the face gear 2 so that the pinion and the face gear are in off center relationship. However, the center axis of the shaft 1a may intersect the center axis of the shaft 2a at right angles therewith so that the pinion and the face gear are in on center relationship. A helical gear may be used instead of a spur gear as the pinion 1.

According to this invention, as the crest $S_2$ of each tooth 2b of the face gear 2 is so formed as to touch or contact the root surface $S_1$ of the pinion 1 while the tooth 2b is in mesh with the teeth 1b, deviation in the engagement of the pinion 1 and the face gear 2 does not occur in the direction normal to the pitch plane P and the regular positional engaging relation can be maintained at all times.

Furthermore, even if some load is exerted on the shafts 1a and 2a toward each other in the above mentioned direction, the regular engaging relation between them will be maintained because of no clearance between the tooth crest $S_2$ of the gear 2 and the root surface $S_1$ of the pinion 1.

Furthermore, by simply pushing or urging the pinion 1 and the face gear 2 toward each other with springs or the like so as to cause their teeth to be engaged with each other before they are assembled, the relative position of the center axes of the shafts 1a and 2a of the pinion 1 and the face gear 2 can be precisely set, whereby the shafts 1a and 2a can be easily fixed in position, and the pinion 1 and the face gear 2 can rotate smoothly because no deviation between the pitch plane P of the face gear 2 and the center axis of the shaft 1a of the pinion 1 occurs even in the case of wear of the tooth surfaces.

We claim:

1. A face gear assembly comprising a face gear having teeth arranged in annular disposition and directed in the direction parallel to the rotational axis of the face gear, each of said teeth having a substantially flat crest, and a pinion having teeth in engagement with said teeth of the face gear, said pinion having a root surface between two adjoining teeth thereof, said crest being formed to contact the root surface between two adjoining teeth of the pinion which are in mesh with the tooth of said crest.

* * * * *